INVENTORS:
FRANÇOIS VAN DAALEN
HANS R. VAN DOMSELAAR
HENRICUS HOOYKAAS
BY:
THEIR AGENT

INVENTORS:
FRANÇOIS VAN DAALEN
HANS R. VAN DOMSELAAR
HENRICUS HOOYKAAS
BY:
THEIR AGENT

United States Patent Office 3,467,191
Patented Sept. 16, 1969

3,467,191
OIL PRODUCTION BY DUAL FLUID INJECTION
Francois Van Daalen, Hans R. Van Domselaar, and Henricus Hooykaas, Rijswijk, Netherlands, assignors to Shell Oil Company, New York, N.Y., a corporation of Delaware
Filed Nov. 17, 1966, Ser. No. 595,143
Claims priority, application Great Britain, Apr. 7, 1966, 15,597/66
Int. Cl. E21b 43/16, 43/22
U.S. Cl. 166—269   5 Claims

ABSTRACT OF THE DISCLOSURE

A process for recovering oil from an underground formation comprising injecting into the formation a viscosity reducing agent lighter than oil (e.g., solvent, steam, combustion air) into the upper part of a formation so as to drive the oil to a production well which communicates with the upper formation part only. Water is supplied to the lower formation part for lifting the oil into the upper formation part.

---

Figure 1:
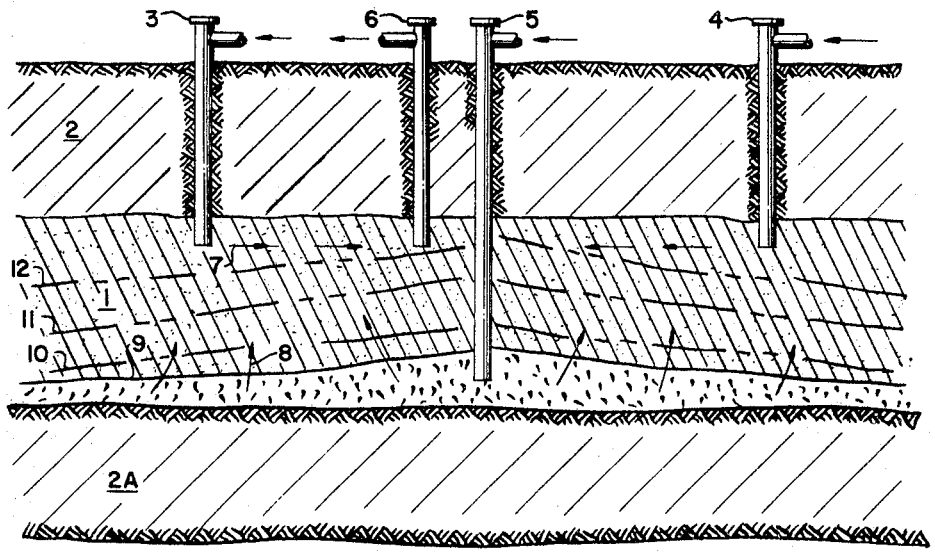

The present invention relates to a method of producing liquid hydrocarbons from a subsurface formation by means of fluid or fluids reducing the viscosity of the hydrocarbons thereby decreasing the resistance to flow encountered by the hydrocarbons on passing through the formation pore space to the production wells, and consequently increasing the production rate thereof.

One group of fluids suitable to reduce the viscosity of hydrocarbons is formed by the so-called thermal fluids. These fluids raise the temperature of the hydrocarbons, thereby decreasing the viscosity thereof. These fluids may be at a high temperature when being injected into the formation, and when flowing through the formation transfer their heat to the formation rock and the hydrocarbons contained in the pore space thereof. Examples of such hot fluids are hot liquids, such as water, and hot gases, e.g., hot condensable vapors such as steam.

Further, there are to be understood under the term "thermal fluids" those fluids which, when injected into the formation, generate heat in situ by reacting with the oil. An example of such fluid is air, which when contacting oil which is at a suitable ignition temperature burns the oil, thereby releasing a considerable amount of heat.

Another group of fluids which are suitable to reduce the viscosity of hydrocarbons to be recovered from underground formations is constituted by liquids which act as a solvent for the hydrocarbons to be recovered. Such solvent may be injected as a slug which is driven through the formation by a water drive. The solvent may also be passed through the formation between the injection well and the production well in the form of several slugs, having slugs of water therebetween. If the solvent is oil-miscible as well as water-miscible, a mixture of solvent and water may be passed through the formation to drive the hydrocarbons to the production well. This mixture may either be prepared at the surface before injecting or is formed underground by injecting separate streams of water and solvent into the formation, where these streams intermingle and mix.

These known processes, in which the hydrocarbons which are driven to the production wells have undergone a treatment for reducing their viscosity, are all based on the application of a fluid drive, in which the zone between the driving medium and the hydrocarbons being driven is substantially vertical. This will be the case in fluid drives which are carried out in formations in which the conditions are such that segregation between the driving fluid and the hydrocarbons under influence of the earth gravity is small or negligible. As long as such is the case, the hydrocarbons will be pushed to the production wells by a substantially vertical displacement front which acts as a piston.

Problems occur, however, in those cases where the influence of earth gravity on the segregation of the driving fluid and the hydrocarbons is great. The driving fluid when formed by combustion air, steam, or another fluid having a specific gravity smaller than the specific gravity of the hydrocarbons will then, after being injected via the injection wells, pass preferably through the top part of the formation in the direction of the production wells, thereby by-passing the majority of the hydrocarbons, which remain unrecoverable by this method. Such by-passing of the oil (or breakthrough to the production wells) by the driving medium is detained as long as possible by back-pressuring the production wells, and having the entry thereto at the lowest possible level within the formation.

When applying hot fluids having a specific gravity higher than the specific gravity of oil as driving medium (such as water), these fluids pass preferably through the bottom part of the oil-containing formation in the direction of the production wells, thereby by-passing the majority of the hydrocarbons, which remain uncoverable by this method. Such by-passing of the oil (or breakthrough to the production wells) by the driving medium is detained as long as possible by back-pressuring the production wells, and having the entry thereto at a high level within the formation.

The present invention relates in particular to the recovery of oil from underground formations, in which the recovery is greatly influenced by gravity segregation, such as occurs in formations extending over great vertical intervals and/or having a high permeability, and/or when applying a driving medium having a large specific gravity difference with respect to the oil to be recovered.

Object of the invention is a method for the economic recovery of hydrocarbons from such formations, which hydrocarbons cannot be produced economically from the formation under influence of the natural energy, in which the viscosity-reducing driving medium has a specific gravity which differs from the specific gravity of the hydrocarbons to be recovered, and the formation to be treated extends over a great interval in a vertical direction and/or has a high permeability.

According to the invention, the method of producing hydrocarbons from a subsurface permeable formation comprises supplying to the formation a first fluid having a specific gravity lower than the specific gravity of the hydrocarbons and a second fluid having a specific gravity higher than the specific gravity of the hydrocarbons, the first fluid flowing through the upper part of the formation and reducing the viscosity of the hydrocarbons in that part of the formation, the second fluid flowing through the lower part of the formation, and producing hydrocarbons from the lower formation part only.

Under "upper part of the formation" there is herein to be understood that formation part through the pore space of which the actual flow of the first fluid takes place, as well as, if the first fluid is a thermal fluid, the neighboring pore space in which the viscosity of the hydrocarbons present therein is being reduced by heat transfer from the first fluid.

The recovery method may be carried out by simultaneously or alternately, continuously or discontinuously injecting the two fluids in either a single injecting well or in separate wells and producing hydrocarbons from a production well located at some distance from the injection well of the first fluid.

The first fluid (or the reaction product thereof) is removed from the formation via at least one well which communicates with the upper part of this formation. Preferably this well is the same as the production well.

In another embodiment of the invention, the first fluid is injected first, whereafter the injection of the second fluid and the production of hydrocarbons take place simultaneously. The production of hydrocarbons takes place via the injection well of the first fluid. The injection of the second fluid may occur via the same well, or a well located at some distance therefrom.

The invention will be further explained with reference to the drawings, in which various embodiments of the invention are shown by way of example.

Figure 2:
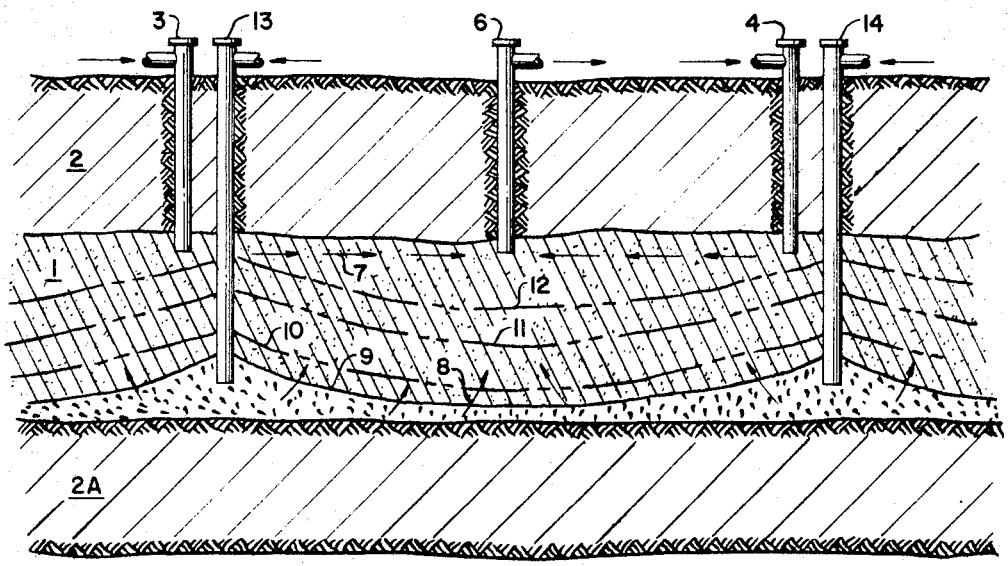
Figure 3:
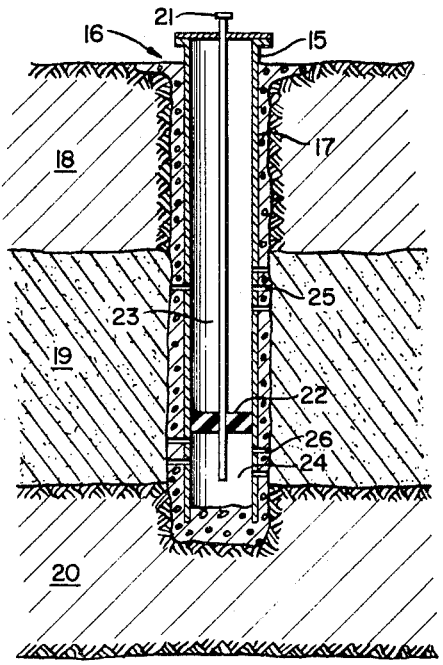
Figure 4:
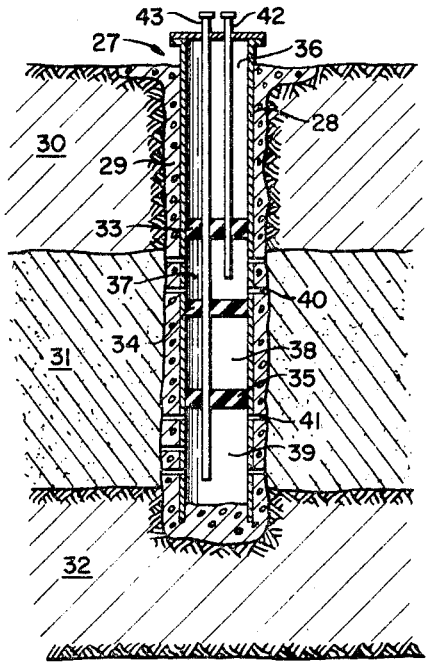
Figure 5:
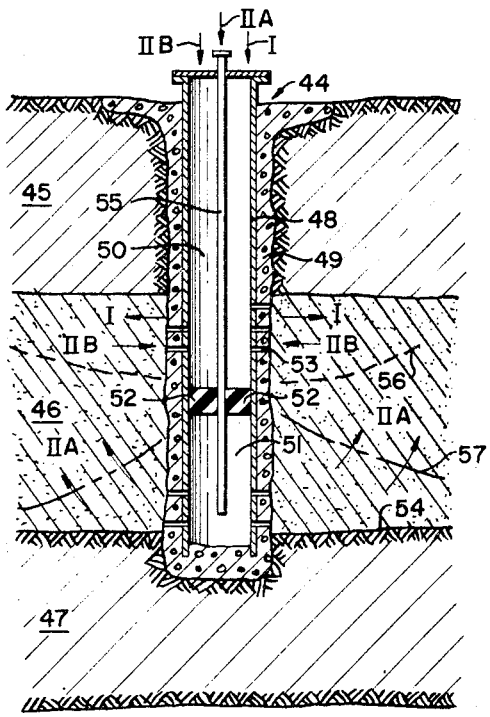
Figure 6A:
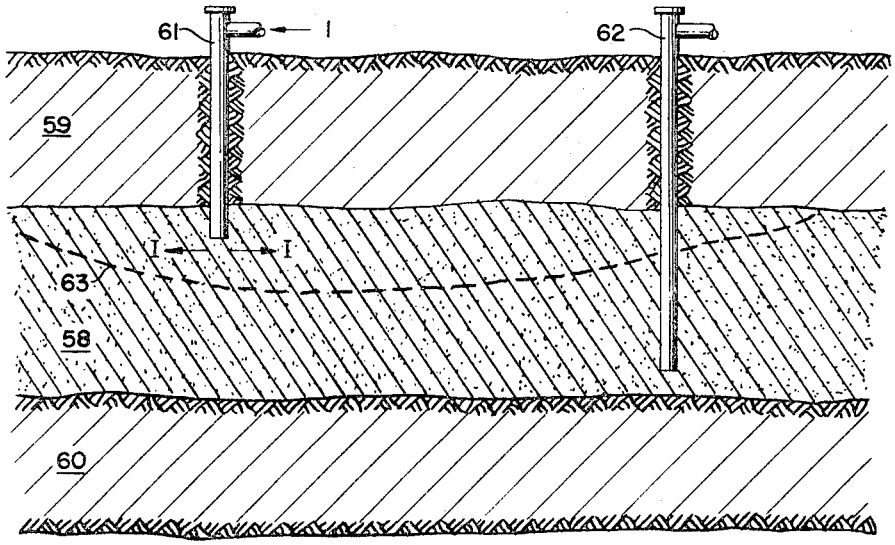
Figure 6B:
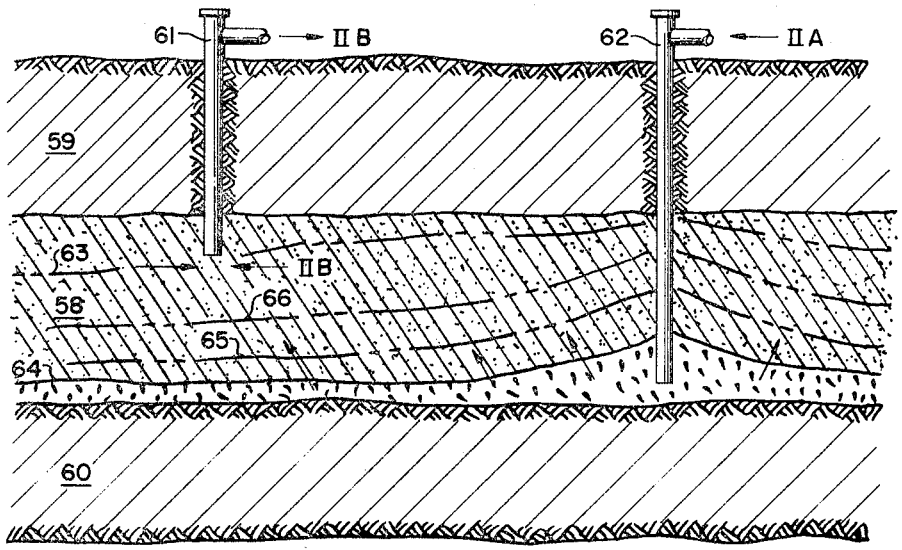

FIGURES 1 and 2 each show a vertical section of an oil-containing formation in which the oil is recovered via a well which is different from the well in which the relatively light-weight fluid is injected;

FIGURES 3 and 4 each show in a schematical way a longitudinal section of a well into which the relatively light-weight fluid as well as the relatively heavy-weight fluid can be injected;

FIGURES 5, 6A and 6B each show a vertical section of an oil-containing formation, in which the oil is recovered via the same well as has been used for injecting the relatively light-weight fluid; and, FIGURE 1 shows a vertical section of part of the subsurface, in which the oil-containing formation 1 is located which is bounded at its upper and at its lower part by a substantially impermeable formation. Through the impermeable formation 2 overlying the oil-containing permeable formation 1 several wells have been arranged, which penetrate into the formation 1, which formation 1 is between impermeable overlying formation 2 and underlying formation 2a. The wells 3 and 4 are equipped as injection wells, and communicate with the upper part of the pore space of the formation 1. The well 5 is also equipped as an injection well, but contrary to the wells 3 and 4, communicates with the lower part of the pore space of the formation 1. These wells have been indicated schematically, and all the details, such as wellheads, injection tubings, casing, liners and cement layers have not been shown for sake of simplicity.

The well 6 is equipped as a production well and communicates with the upper part only of the pore space of the formation 1. The details of this production well are not shown in the drawings since they are known per se and do not form part of the invention.

The method for recovering oil from the formation 1 in FIGURE 1 via the production well 6 is now carried out as follows.

A viscosity-reducing fluid having a specific gravity less than that of the oil contained in the pore space of the formation 1 is injected via the wells 3 and 4 into the upper part of the pore space of this formation 1. This fluid then passes through the upper part of the pore space of the formation 1 in the direction of the arrows 7 to the production well 6 as well as to any other production well similar to the well 6 if such a well is provided in the same field as the well 6.

On passing through the formation 1, the fluid which is injected via the wells 3 and 4 reduces the viscosity of the oil present in the upper part of the pore space of the formation 1, thereby at the same time displacing the oil in this part towards the production well 6, via which the displaced oil as well as the displaced fluid is guided to the surface.

The fluid for reducing the viscosity of the oil in the upper part of the formation 1 may be formed by a solvent suitable for dissolving oil therein. This solvent, which has a specific gravity less than that of the oil, is injected into the upper part of the formation 1 via the wells 3 and 4, and passes through the upper part of the pore space of the formation 1, thereby dissolving the oil. The fluid mixture passing out of the well 6 is treated in order to separate the oil and the solvent, whereafter the regenerated solvent is introduced again via the wells 3 and 4 into the upper part of the formation 1. As solvents there may be used propane, butane or mixtures thereof, as well as any other solvent which has a specific gravity less than that of oil and which is completely miscible with the oil under formation conditions.

In still another embodiment of the invention steam may be used as a viscosity-reducing fluid, which is either dry (superheated) or wet. This steam is generated by a suitable steam generator, which is known per se and not described in detail here. The condensate which is produced together with the oil via the well 6 is separated from the oil. Any heat carried by the fluid mixture passing out of the well 6 may be used for preheating the feed water to be supplied to the steam generator. The feed water is, if such is necessary, pretreated by one of the known methods to adapt this water as a source for steam suitable to be injected into the upper part of the pore space of the formation 1.

After the upper part of the formation 1 has been treated by a fluid so as to reduce the viscosity of the oil present in the pore space of this upper part, the first stage of the method as described with reference to FIGURE 1 is over. During the second stage of the method, the injection of the viscosity-reducing fluid through the wells 3 and 4 is continued, and simultaneously therewith a liquid having a specific gravity greater than the specific gravity of oil is injected via the well 5 into the lower part of the formation 1. It will be clear that water is the cheapest fluid for this purpose. The water passes in a radial direction from the point at which the well 5 communicates with the pore space of the formation 1, thereby driving the oil from the pore space at the lower part of the formation and lifting this oil in a vertical direction as indicated by the arrows 8. The oil contained in the pore space of the formation 1 is thereby lifted as a whole, such that the upper layer of this oil enters the upper part of the formation. When applying a solvent as viscosity-reducing fluid, the pore space of the upper part of the formation is filled with flowing solvent which reduces the viscosity of the oil entering the pore space of this upper part and guides it in the direction of the arrows 7 to the production well 6. When applying a thermal fluid as a viscosity-reducing fluid, the upper formation part includes the pore space through which the thermal fluid is flowing, as well as the pore space in which the viscosity of the oil is reduced by the heat transferred by this thermal fluid. This latter oil flows towards the production wells in the direction of the arrows 7, and its place is taken by cold oil which is lifted in an upward direction by the injected water. This cold oil is heated to reduce its viscosity and flows thereafter to the production well 6. The displacement of the boundary 9 between the water injected through the well 5 and the oil contained in the pore space of the formation 1 is indicated as a function of time by the lines 10, 11 and 12. When water is being produced from the production well 6 in quantities which render the recovery of oil no longer economic, the injection of the fluids through the wells 3, 4 and 5 is stopped, and the field is abandoned.

Another embodiment of the invention will now be described with reference to FIGURE 2 of the drawing. Just as in FIGURE 1, there is shown in FIGURE 2 a vertical section over an oil-containing formation. The same reference numerals will be applied as in FIGURE 1. The only exception is made for the injection well through which the water is injected into the formation. The water injection well 5 as shown in FIGURE 1 is arranged near the production well 6, whereas the injection wells 13 and 14 in the arrangement as shown in FIGURE 2 are located near the injection wells 3 and 4 respectively through which wells fluid with viscosity-reducing properties is to be injected. In this pattern of wells, formed by injection wells 3 and 4 for fluid having a specific gravity smaller than the specific gravity of the hydrocarbons to be recovered, the production well 6 and the injection wells 13 and 14 for injecting a fluid having a specific gravity greater than the oil contained in the pore space of the formation 1, the method according to the invention is carried out in the same manner as described with reference to the well pattern as shown in FIGURE. 1.

The first stage of the method comprises the injection of a lightweight viscosity-reducing fluid (e.g., steam solvent) into the part of the pore space of the formation 1, thereby driving the oil present therein to the production well 6 (see arrows 7). Thereafter a liquid having a specific gravity which is higher than the specific gravity of the oil present in the formation 1 is injected into the lower part of the formation, thereby lifting the oil into the formation 1 and displacing the top of the oil volume contained in the pore space of the formation 1 into the zone through which the viscosity-reducing fluid is flowing in the direction of the arrows 7. The progressive growth of the volume of fluid in the lower part of the formation 1 shifts the boundary 9 between this fluid and the oil successively as indicated by the lines 10, 11 and 12 until this fluid is being produced together with the oil through the well 6 in quantities which make the method no longer economic. The field is then abandoned.

It will be appreciated that the injection wells as used for injecting into the formation 1 the fluid having a specific gravity higher than the specific gravity of the oil may also be located in a manner other than indicated in FIGURES 1 and 2. Thus, these wells may be arranged somewhere between the injection wells 3, 4 and the production well 6. If arranged just near one of the wells 6 (FIGURE 1), or 3 and 4 (FIGURE 2) the injection wells 5, 13, 14, respectively, are preferably located in the same borehole as the wells 6 and 3, 4, respectively.

Two of these arrangements are shown in FIGURES 3 and 4.

In FIGURE 3, casing 15 has been suspended in the borehole 16, and cemented therein by a layer 17. As shown, the borehole 16 penetrates the formations 18, 19 and (but not necessarily) the formation 20. The formations 18 and 20 are impermeable or approximately impermeable, whereas the formation 19 is permeable and contains oil in the pore space thereof. A tubing 21 is suspended inside the casing 15 from the top thereof, which tubing passes in a liquid- and gas-tight manner through a packer 22 arranged in the casing 15. This packer 22 is located at a level between the top and the bottom of the formation 19, thereby dividing the interior of the casing 17 into a space 23 and a space 24. The space 23 communicates with the pore space of the formation 19 via channels or perforations 25 passing through the casing 15 and the cement layer 17, which channels or perforations may have been shot or made in one of the other known manners. The lower space 24 communicates with the pore space of the formation 19 via perforations 26, which are arranged over the lower part of the formation 19.

The arrangement as shown in FIGURE 3 may be used in the application of the method as described with reference to FIGURE 2. Light-weight viscosity-reducing fluid, such as air or solvent, is introduced into the top of the casing 15 and passes through the annular space around the tubing 21 downwards until it arrives in the space 23. Via the perforations 25 it passes into the formation 19 for reducing the viscosity of the oil in the upper part of this formation. Fluid having a specific gravity greater than the oil to be recovered (e.g., water) is then injected at the top of the tubing 21 and enters at the bottom of this tubing into the space 24 from which it flows via the perforations 26 into the pore space of the formation 19, where it displaces the oil in an upward direction.

When the well installation as shown in FIGURE 3 is applied in the method as described with reference to FIGURE 1, it may replace the schematically indicated wells 5 and 6. The function of the tubing 21 then remains the same. Through the perforations 25, however, the oil together with the viscosity-reducing fluid enters the space 23, from which it is lifted to the surface by (not shown) means such as a well pump with production tubing or a gas-lift system.

The well installation as shown in FIGURE 3 is not preferred to be used for the injection of steam as viscosity-reducing agent, since the heat losses when passing steam through the casing 15 will be excessive. However, the well assembly as shown in longitudinal section in FIGURE 4 may be used for this purpose.

In the borehole 27 (FIGURE 4) the casing 28 is cemented by a cement layer 29. The borehole 27 passes through the formations 30 and 31 and penetrates into the formation 32. The formations 30 and 32 of impermeable or approximately impermeable nature and the formation 31 is a permeable oil-containing formation from which oil is to be recovered by the present method. Three packers 33, 34 and 35 divide the casing interior into spaces 36, 37, 38 and 39. The spaces 37 and 39 communicate via perforations 40, 41, respectively, with the pore space of the formation 31. The perforations 40, 41 are arranged over the upper and lower part of the formation 31, respectively. From the top of the well there are suspended tubings 42 and 43 of which tubing 42 passes in a liquid- and gas-tight manner through the packer 33 and communicates with the pore space of the formation 31 via the space 37, and tubing 43 passes in a liquid- and gas-tight manner through the packers 33, 34 and 35 and communicates with the pore space of the formation 31 via the space 39. The outer surface of the tubing 42 may be covered by a heat-insulating layer.

During the first stage of the method according to the invention, in which a well assembly as shown in FIGURE 4 is applied for the injection of the required fluids, steam is supplied to the formation 31 via the tubing 42. After a sufficient reduction of the viscosity of the oil present in the upper part of the formation 31 has been obtained, the second stage of the method starts, during which stage the injection of steam is continued and liquid having a specific gravity greater than the specific gravity of the oil is injected via the tubing 43 into the lower part of the formation 31. This liquid (which is preferably water) displaces the oil in an upward direction, thereby driving it into the zone through which the steam passes on its way to the production well. The viscosity of the oil entering this zone is reduced and the oil flows under influence of the pressure differential existing in the formation 31 to the production well from which it is recovered.

It will be understood that in the methods as described with reference to FIGURES 1, 2, 3 and 4, the injection of the relatively high-specific-weight fluid (such as water) into the lower part of the formation 1 may also start at an earlier time than indicated in the foregoing description. If desired, the injection of water may start simultaneously with the injection of the viscosity-reducing fluid.

It will futher be understood that the injection of water and the viscosity-reducing fluid need not be continuous. If desired, these injections may be interrupted from time to time, or may even alternate.

Whereas in FIGURES 1 and 2 of the drawing two embodiments of the present invention have been described in which the viscosity-reducing fluid and the oil are injected and produced respectively via separate wells, there will now be given two examples of a recovery method according to the present invention in which the injection of the viscosity-reducing agent and the production of oil take place via one and the same well.

In FIGURE 5 of the drawing, a borehole 44 penetrates through the formations 45 and 46. Formation 45 is just as the formation 47 (which is located below the formation 46) of an impermeable or approximately impermeable nature. The permeable formation 46 contains oil in its pore space, which oil is to be recovered by the present method. A casing 48 is cemented in the borehole 44 by a cement layer 49. The interior of the casing 48 is divided into two spaces 50 and 51, by packer 52, which spaces communicate via the openings or perforations 53, 54, with the upper and lower part of the pore space of the formation 46, respectively. A tubing 55 is suspended from the top of the well and passes in a liquid- and gas-tight manner through the packer 52 and communicates at its lower end with the space 51 and consequently via the perforations 54 with the pore space of the formation 46.

During the first stage of the present method when carried out in the well assembly as shown in FIGURE 5, a relatively light-weight viscosity-reducing fluid is passed through the space 50 around the tubing 55 and injected via the perforations 53 into the upper part of the formation 46 (see arrow I), where it reduces the viscosity of the oil present therein. After the viscosity of a sufficient amount of oil has been reduced (e.g., to the extent as indicated by the boundary line 56), the injection of the viscosity-reducing agent is stopped. Subsequently, the wellhead is made suitable for the passage of a mixture of oil and viscosity-reducing agent, which mixture is produced through the annular space 50 in the direction as indicated by arrow II-B.

The oil is driven out of the formation 46 by the injection of a liquid having a specific gravity greater than the specific gravity of the oil, into the lower part of the formation 46. To this end, such liquid (e.g., water) is injected in the direction of arrows II-A via the tubing 55, the space 51 and the perforations 54 into the pore space of the formation 46. The liquid spreads radially over the bottom of the formation 46, thereby displacing the oil in an upward direction. The boundary between the liquid zone and the oil is schematically indicated by the line 57. The oil which is displaced in an upward direction displaces the oil in the zone bounded by the line 56 in the direction II-B of the perforations 53, via which this oil flows into the space 50. Suitable lifting means may be provided in the space 50 for transporting the oil to the surface.

When the amount of oil with reduced viscosity has been displaced from the formation 46, the injection of liquid via tubing 55 is interrupted, and the viscosity-reducing agent is injected once more via the annular space 50 into the upper part of the pore space of the formation 46 (see arrows I). After the viscosity of a sufficient amount of oil has been reduced to the required extent, the second stage of the method takes place, during which water is injected via the tubing 55 into the lower part of the formation 46 (arrows II-A) and oil is produced from the upper part of the formation 46 via the annular space 50 (arrows II-B). This cycle may be repeated until the oil surrounding the well has been recovered.

It will be appreciated that the communication between the wellhead (not shown) and the perforations 53 need not necessarily take place via the annular space 50 around the tubing 55, but that a second tubing may be provided which passes in a liquid- and gas-tight manner through a packer member which closes off the passage through the casing 48 at a level just above the perforations 53. The tubing 55 then passes in a liquid- and gas-tight manner through this latter packer member (cf., the arrangement as shown in FIGURE 4).

An alternative of the method as described with reference to FIGURE 5 will now be explained with reference to FIGURES 6A and 6B. These figures show a vertical section of wells penetrating into a permeable oil-containing formation 58 which is enclosed in a vertical direction by impermeable formations 59 and 60, being the cap and base rock of formation 58, respectively. The well 61 penetrating through the formation 59 and into the formation 58 provides a communication between the surface and the pore space of the formation 58 near the upper part thereof, and arrangements are made which render this well suitable for use as an injection well as well as a production well. Further there is arranged a well 62, which penetrates through the formation 59 and into the formation 58, such that the lower end thereof is in communication with the pore space of the formation 58 near the lower part thereof. The well 62 is provided with (not shown) equipment which allows the use of this well as an injection well.

The two stages of the method according to the invention are shown in FIGURES 6A and 6B, respectively. During the first stage (FIGURES 6A), a light-weight viscosity-reducing agent is injected into the top of the formation 58 (arrows I), thereby reducing the viscosity of the oil present therein. The lower boundary of the zone, in which the viscosity of the oil has been sufficiently reduced to enable an economic production of this oil, is schematically indicated by the line 63. During the second stage, which is illustrated in FIGURE 6B, the well 61 acts as production well, and the well 62 as an injection well. Water is injected via the well 62 (see arrows II-A) into the lower part of the formation 58, thereby lifting the oil in the pore space of this formation and displacing the oil having a reduced viscosity to the well 61 via which (see arrows II-B) it is lifted to the surface under influence of the energy contained in the oil and the energy supplied by the injected water. If required, pumping means may be arranged in the well 61 and be operated during this second stage.

After the oil, of which the viscosity has been reduced during the first stage of the method, has been recovered during the second stage, the first stage is repeated to reduce the viscosity of the oil which is then present in the top of the formation 58. This stage is followed again by the second stage during which the oil having a reduced viscosity is displaced to the production well by the water injection in the bottom layer of the formation. The cycle is repeated as many times as necessary. The boundaries of the water zone after the successive cycles are indicated schematically by the lines 64, 65 and 66.

The viscosity-reducing agent applied in the method as described with reference to the FIGURES 6A and 6B may be similar to those already indicated in the foregoing examples.

We claim as our invention:

1. In a method of producing oil from a permeable subsurface formation containing essentially only oil comprising the steps of:
(a) injection into the upper part of an oil-containing permeable zone of the formation through an injection well in communication with said permeable oil-containing zone of the formation a miscible hydrocarbon solvent having a specific gravity lower than the specific gravity of the oil in an amount sufficient to reduce the viscosity of the oil to a flowable viscosity;
(b) injecting through an injection well as in (a) water but into the lower part of the formation in an amount sufficient to drive the oil therefrom to the upper portion of the permeable oil-containing production zone;
(c) driving the flowable liquid hydrocarbon to a production well in communication with the upper portion of the permeable production zone; and,
(d) recovering the flowable liquid hydrocarbon from the upper permeable portion of the production zone.

2. The method of claim 1 wherein the injecting fluids of steps (a) and (b) are injected into the formation through different injection wells.

3. The method of claim 2 wherein the injection fluids are injected simultaneously.

4. The method of claim 2 wherein in step (a) the injection fluid is propane.

5. The method of claim 1 wherein the injecting fluids of steps (a) and (b) are injected via a common well.

References Cited

UNITED STATES PATENTS

| | | | |
|---|---|---|---|
| 3,369,601 | 2/1968 | Bond et al. | 166—9 |
| 3,371,711 | 3/1968 | Odeh et al. | 166—9 |
| 1,491,138 | 4/1924 | Hixon | 166—11 |
| 2,669,306 | 2/1954 | Teter et al. | 166—9 |
| 2,828,819 | 4/1958 | Hughes | 166—9 |
| 2,859,818 | 11/1958 | Hall et al. | 166—9 |
| 2,969,226 | 1/1961 | Huntington | 166—11 |
| 3,083,764 | 4/1963 | Gaskell et al. | 166—9 |
| 3,096,821 | 7/1963 | Dyes | 166—9 |
| 3,159,215 | 12/1964 | Meldau et al. | 166—11 X |
| 3,332,488 | 7/1967 | Wilson | 166—11 |
| 3,358,759 | 12/1967 | Parker | 166—11 |

OTHER REFERENCES

Reidel, John C., Simultaneous Gas and Water Injection, in Oil & Gas Journal, Nov. 7, 1955, pp. 120, 121, 123.

CHARLES E. O'CONNELL, Primary Examiner

IAN A. CALVERT, Assistant Examiner